Figure 1:
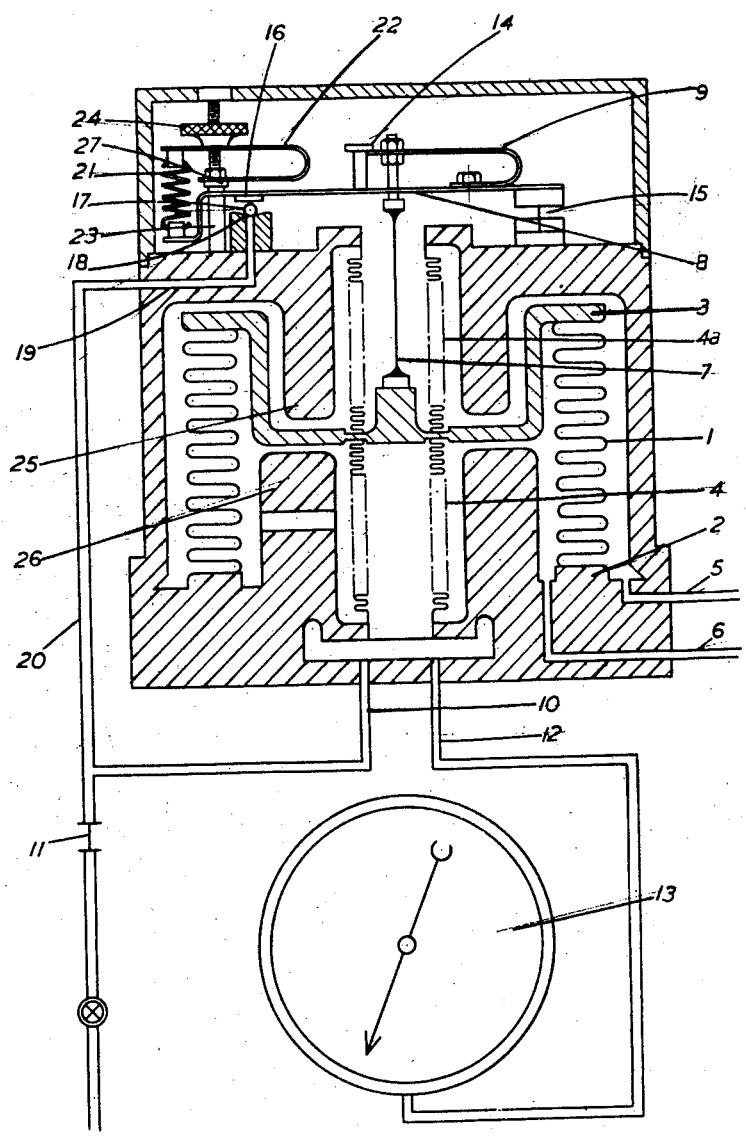

Dec. 26, 1950 C. H. GREGORY ET AL 2,535,202
INDICATING, RECORDING, AND CONTROLLING APPARATUS
Filed Feb. 27, 1945 2 Sheets-Sheet 1

Inventors
C. H. Gregory
By J. Hall
By Glascock Downing Tuttle
Attorneys

Dec. 26, 1950  C. H. GREGORY ET AL  2,535,202
INDICATING, RECORDING, AND CONTROLLING APPARATUS
Filed Feb. 27, 1945  2 Sheets-Sheet 2

Inventors
C. H. Gregory
J. Hall
By Glascock Downing Seibold
Attorneys

Patented Dec. 26, 1950

2,535,202

UNITED STATES PATENT OFFICE 2,535,202

INDICATING, RECORDING, AND CONTROLLING APPARATUS

Charles Henry Gregory, Eaglescliffe, and John Hall, Norton-on-Tees, England, assignors to Imperial Chemical Industries Limited, a corporation of Great Britain Application February 27, 1945, Serial No. 579,982 In Great Britain March 7, 1944

2 Claims. (Cl. 137—153)

This invention relates to apparatus suitable for indicating, recording or controlling small movements, and physical quantities such as temperature and pressure which are capable of producing small movements.

Many types of apparatus suitable for these purposes are known, some of which are designed for coarse measurement or control, which they perform quite satisfactorily, while others are designed for accurate and sensitive measurement and control. The design of a satisfactory apparatus of the latter type presents many difficult problems, and although known forms of apparatus are capable of giving good results, they require very skilled adjustment and maintenance, which is a disadvantage for industrial uses.

The present invention has for its object the provision of an improved apparatus of a type known in itself, suitable for accurate and sensitive measurement or control, in which small movements to be measured or controlled or small movements produced by changes in a physical quantity to be measured or controlled, actuate a regulating valve in a fluid pressure system, the pressure in which is then utilised to indicate record or control the small movements or the physical quantity.

According to the present invention in apparatus of the type described, the regulating valve comprises a sphere co-operating with a horizontally arranged valve seating and adapted to be pressed by the fluid pressure away from the seating and into contact with an abutment which is movable towards and away from the seating by the small movements to be measured or controlled or by small movements produced by changes in the physical quantity to be measured or controlled. The apparatus is thereby rendered readily adjustable and easy to maintain even under industrial conditions while still maintaining accuracy and sensitivity.

The movements to be measured or controlled may be transmitted to the abutment by means of a lever, of which the abutment may conveniently form part. When a lever is used, it is advantageously anchored to its support by a flexible strip serving as a fulcrum.

In order to avoid damage to the sphere or the valve seating it is preferred to include in the means for transmitting the movements to the abutment, a member which yields when the seating pressure on the sphere exceeds a predetermined limit. A further feature of the invention consists in the provision of means for transmitting the movements to the abutment which include a member of fixed length, which is normally under load in one direction and is incapable of transmitting movement in the opposite direction; conveniently the member is normally under tension and is incapable of transmitting movement under compression, being for example, a strip of Invar or Phosphor bronze. This feature is particularly desirable when the movements are transmitted to the abutment through a lever which has a flexible strip as fulcrum. Excessive movements of the abutment away from the valve seating can then be prevented by the provision of a stop, thereby avoiding damage to the fulcrum.

The invention is applicable to apparatus of known kind in which the small movements occur in an elastically constrained element, for example, the end of a metallic bellows chamber, and are themselves caused by a fluid pressure (hereinafter referred to as the separate fluid pressure) which is separate from the fluid pressure used for the measuring, recording or controlling, the apparatus being intended for measuring or recording the separate fluid pressure or for exerting a control in accordance with variations of the separate fluid pressure.

This invention is furthermore applicable to a known modification or development of the apparatus referred to in the preceding paragraph in which the fluid pressure acts upon the elastically constrained element in opposition to the separate fluid pressure, and any variations in the separate fluid pressure displacing the element produce counter-balancing variations in the fluid pressure which restrict the displacement of the element. When the present invention is incorporated in apparatus of this type, it is particularly advantageous to transmit the movement of the element to the abutment by means of a lever of the third order. Any small variation in the separate fluid pressure displacing the elastically constrained element can thereby be made to produce a large change in the fluid pressure opposing the displacement of the element so that the actual displacement of the element is reduced to such a very small value as to be practically zero. Consequently the forces due to the deflection of the means which elastically constrain the element are so small compared with those due to the fluid pressure and the separate fluid pressure that for practical purposes the fluid pressure is directly proportional to the separate fluid pressure.

Two forms of the invention of the type referred to in the preceding paragraph will now by way of example be described with reference to the accompanying drawings.

Figure 2:
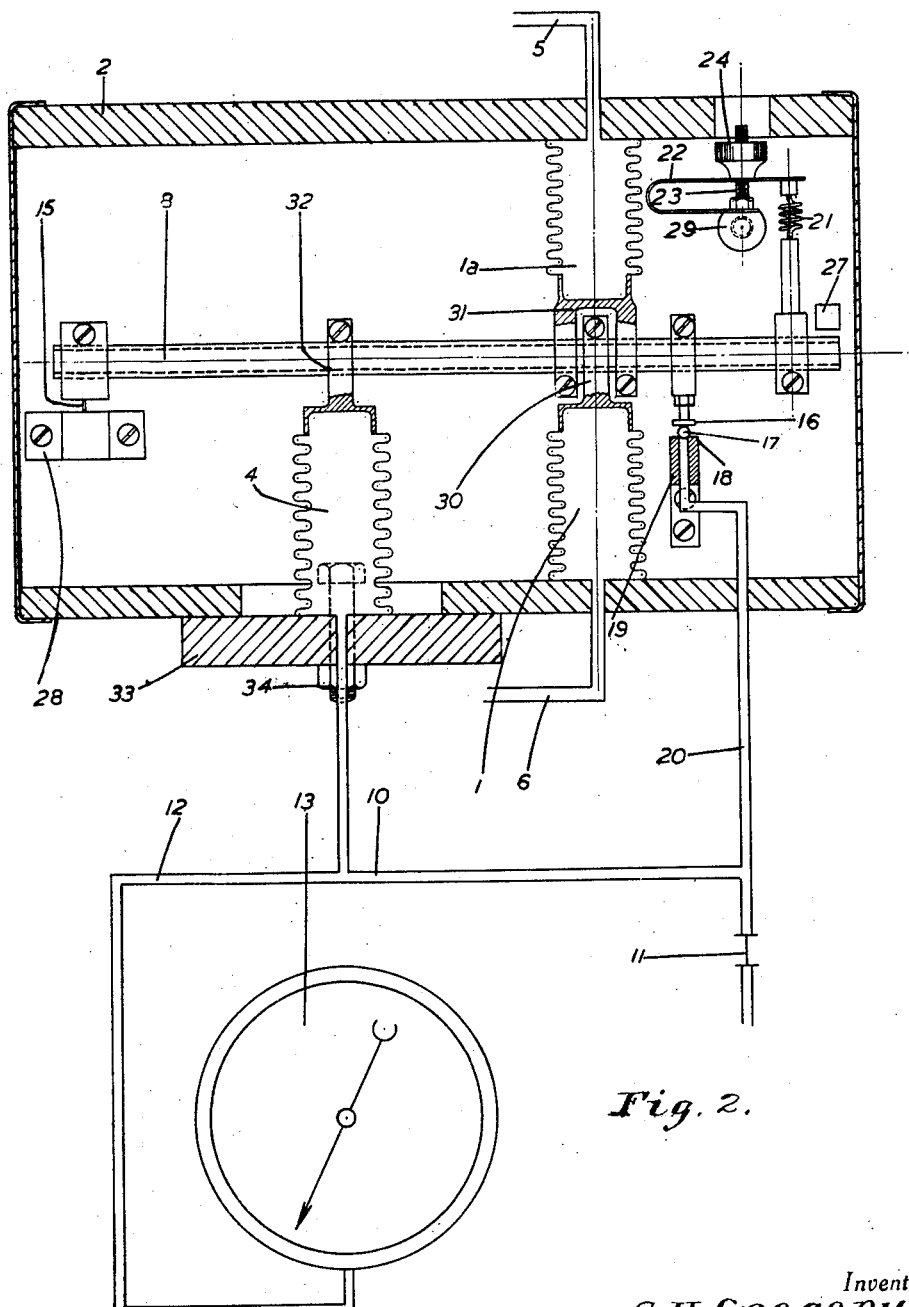

Fig. 1 is sectional view partly diagrammatic of the first form and Fig. 2 is a similar view of the second form, like parts in the two figures bearing the same references.

Referring now to Fig. 1, reference numeral 1 indicates a metallic bellows which is attached at one end to the casing 2 of the apparatus. The other end of the bellows is attached to a metal member 3 which is elastically constrained by the bellows 1. Attached also to the member 3 are two identical metallic bellows 4 and 4a which are fixed at their other ends to the casing 2. Pipes 5 and 6 are provided for applying pressures to the outside and inside respectively of the bellows 1, the difference between which is the separate fluid pressure which is to be measured. The inside of the bellows 4a is open to the atmosphere and the inside of the bellows 4 communicates through a pipe 10 and a reducing valve 11 with a source of substantially constant pressure, not shown. A pipe 12 also connects the inside of the bellows 4 with a pressure indicating instrument 13.

The member 3 is attached to a flexible metallic strip 7 the head of which passes freely through a hole in a lever 8 and is anchored to a U spring 9, which is itself attached at one end to the lever 8. The other end of the spring abuts against a stop 14 fixed to the lever 8. The lever 8 pivots on a flexible strip 15 mounted on the top of the casing and carries near its other end a hardened disc 16, which serves as the abutment for a hardened ball 17, which rests freely on a seating 18 at the end of a duct 19 in the casing. The duct 19 communicates directly through a pipe 20 with the inside of the bellows 4 and through the reducing valve 11, with the source of substantially constant fluid pressure. The extreme end of the lever is attached to a light spring 21 which is itself attached to one end of a U spring 22, the other end of which is anchored to a pillar 23 attached to the casing, and passing freely through a hole in the lever 8. The tension of the spring 21 can be altered for the purpose of adjusting the zero reading of the apparatus by means of the knurled head 24. A stop 27 is provided on the pillar 23 to prevent the lever rising sufficiently to damage the flexible strip 15.

The operation of the apparatus is as follows. When the pressure in the pipe 5 increases relatively to that in the pipe 6, the member 3 moves downwardly. This movement is transmitted through the strip 7 and lever 8 to the abutment 16 which presses the ball 17 towards its seating, thereby restricting the escape of fluid. In consequence the pressure in the pipe 20 and the bellows 4 rises, until it counterbalances the increase in pressure difference between pipes 5 and 6 and the member 3 attains an equilibrium position. The change in pressure difference between pipes 5 and 6 is then indicated on the instrument 13. Strictly speaking the elasticity of the bellows influences the equilibrium position of the member, but owing to the small movements of the member, the forces due to the extension or compression of the bellows are negligible compared with those due to the fluid pressure and the separate fluid pressure. Consequently the instrument is practically independent of the physical characteristics of the bellows. If the pressure in the pipe 5 increases excessively relative to that in the pipe 6 causing an excessive downward movement of the member 3, the U spring 9 flexes and thereby prevents an excessive seating load being transmitted to the ball. Excessive movement of the member 3 both upwardly and downwardly which would damage the bellows is prevented by the stops 25 and 26 provided by the casing. When the pressure in the pipe 5 decreases relatively to that in the pipe 6, the member 3 moves upwardly permitting the lever 8 to move upwardly under the influence of the spring 21. The abutment 16 consequently moves away from the seating 18 allowing the ball also to be pushed away from the seating by the fluid pressure in the duct 19. The fluid pressure in the pipe 19 and therefore in the bellows 4 consequently falls until it counterbalances the decrease in pressure difference between the pipes 5 and 6 and the member 3 attains an equilibrium position. The change in the pressure difference between the pipes 5 and 6 is then indicated on the instrument 13.

Referring now to Figure 2, reference numerals 1 and 1a indicate two similar metallic bellows, each of which is attached at one end to the casing 2 of the apparatus, and at the other end to a lever 8, by means of straps 30 and 31. Pipes 5 and 6 are provided for applying pressures to the bellows 1a and 1 respectively, the difference between which is the separate fluid pressure which is to be measured. 4 indicates a bellows which is attached at one end to a base plate 33, and at the other to the lever 8 by means of a strap 32. The base plate 33 is attached by bolts 34 (only one of which is shown) to the casing 2 which is provided with slots for bellows 4 and the bolts, so that the distance of the bellows 4 from the fulcrum can be adjusted. The bellows 4 communicates through a pipe 10 and a reducing valve 11 with a source of substantially constant pressure, not shown. A pipe 12 also connects the pipe 10 with a pressure indicating instrument 13.

The lever 8 pivots on a flexible strip 15 mounted on a bracket 28 which is attached to the casing 2. The lever 8 carried near its end remote from the pivot, a hardened disc 16, which serves as an abutment for a hardened ball 17 which rests freely on a seating 18, at the end of a duct 19. The duct 19 communicates directly through pipes 20 and 10 with the bellows 4. Near the end of the lever remote from the pivot there is also attached a light spring 21 which is itself attached to one end of a U spring 22, the other end of which is anchored to a lug 29, which protrudes from a side wall of the casing 2. A threaded rod 23 is mounted on the lug 29 and passes freely through a hole in the upper limb of the U spring 22. A tapped knurled head 24 is provided on the rod 23 for the purpose of adjusting the zero reading of the apparatus by altering the tension of the spring 21. A stop 27 projecting from the side wall of the casing prevents the lever 8 rising sufficiently to damage the flexible strip 15.

If the areas of the ends of the bellows are not quite equal and their centres of pressure are equidistant from the fulcrum, then the position of the lever for equal pressures on both bellows will vary with the absolute pressure in the bellows. The bellows 1 and 1a however need not be accurately matched since constancy of zero can be obtained by altering slightly the relative positions of the straps 30 and 31. Also by adjusting the position of the bellows 4 by means of the adjustable strap 32 and the adjustable base plate 33, the desired range of the apparatus can be made to match the full scale of any given indicating instrument 13.

The range of the apparatus can also be readily altered by changing the size of the bellows 4.

As examples of physical quantities which may be indicated, recorded or controlled by the apparatus of this invention may be mentioned: fluid pressures including very low absolute pressures; the flow of fluids in pipes or ducts by using the apparatus in conjunction with an orifice plate, venturi, nozzle or Pitot tube; temperature, for example, by using the apparatus in conjunction with a gas thermometer; density of liquids, for example, by the aid of two dip tubes dipping respectively into two constant level vessels which are contiguous to maintain equality of temperature, through which tube the liquid the density of which is to be measured and a standard liquid respectively circulate, air or other gas being fed at constant rate through respective bubblers to the two dip tubes and the pressures developed in the two tubes respectively being led to the apparatus of the invention; density of gases, for example, by passing the gas through a vertical tube and comparing the pressure at the base of the tube with that of a standard gas such as air at the base of a second vertical tube by leading the two pressures to the apparatus of the invention, the vertical height and the choice of the standard being determined by the gas being measured, the sensitivity of the apparatus and so forth; liquid level, for example by using the apparatus in conjunction with an air-operated depth gauge.

We claim:

1. In apparatus whereby the difference between two fluid pressures which may vary can be indicated, recorded or controlled, the combination of: a simple lever; a flexible strip suspending the lever; a metallic bellows of substantially cylindrical form, anchored at its bottom end and situated within a space closed except for an aperture, having a wide diameter relative to its height and to the interior of which one of the aforesaid fluid pressures and to the exterior of which the other aforesaid fluid pressure can be applied, whereby a differential pressure tending to cause the bellows to move is set up; a second strip connecting the upper end of the bellows to the lever for the purpose of applying to the latter a force varying with the aforesaid pressure differential; a second substantially cylindrical metallic bellows situated within and rigidly connected at its upper end to the upper end of the first metallic bellows and of narrower diameter than, and isolated interiorly from it; a duct; a source of substantially constant fluid pressure connected to said duct and to the interior of said second metallic bellows; a horizontally arranged seating at the end of the said duct; a sphere cooperating with the seating and controlling the egress of the last mentioned fluid from the duct, and hence the supply thereof to the inside of the second metallic bellows, whereby the latter exerts a force tending to bring the lever into equilibrium; and an abutment for said sphere connected to said lever so as to move normally to said lever as it moves under the action of the aforesaid applied force.

2. An apparatus as claimed in claim 1 in which the second strip is anchored to a U-shaped spring, itself attached at one end to the lever adjacent its pivoted end, and in which the other end of the lever is attached to a light spring, itself attached to one end of a U-spring, whose second end is firmly anchored.

CHARLES HENRY GREGORY.
JOHN HALL.

REFERENCES CITED

The following references are of record in the file of this patent:

UNITED STATES PATENTS

| Number | Name | Date |
|---|---|---|
| 1,062,138 | Baylis | May 20, 1913 |
| 2,118,248 | Keinath | May 24, 1938 |
| 2,146,684 | McLaughlin | Feb. 7, 1939 |
| 2,298,112 | Edwards | Oct. 6, 1942 |
| 2,369,463 | Ibbott | Feb. 13, 1945 |

FOREIGN PATENTS

| Number | Country | Date |
|---|---|---|
| 234,194 | Great Britain | May 28, 1925 |